US012680560B1

(12) United States Patent
Lin et al.

(10) Patent No.: US 12,680,560 B1
(45) Date of Patent: Jul. 14, 2026

(54) DETACHABLE FAN DISPLAY

(71) Applicant: THERMALTAKE TECHNOLOGY CO., LTD., Taipei City (TW)

(72) Inventors: Pei-Hsi Lin, Taipei City (TW); Ming-Hua Teng, Taipei City (TW); Hung-Liang Lin, Taipei City (TW); Chu-An Hsieh, Taipei City (TW)

(73) Assignee: THERMALTAKE TECHNOLOGY CO., LTD., Taipei City (TW)

( * ) Notice: Subject to any disclaimer, the term of this patent is extended or adjusted under 35 U.S.C. 154(b) by 0 days.

(21) Appl. No.: 19/281,781

(22) Filed: Jul. 28, 2025

(30) Foreign Application Priority Data

May 16, 2025 (TW) ................................ 114204976

(51) Int. Cl.

| | |
|---|---|
| ***F04D 29/64*** | (2006.01) |
| ***F04D 19/00*** | (2006.01) |
| ***F04D 25/06*** | (2006.01) |
| ***F04D 25/16*** | (2006.01) |
| ***F04D 29/00*** | (2006.01) |

(52) U.S. Cl.

CPC ......... *F04D 29/646* (2013.01); *F04D 19/002* (2013.01); *F04D 25/0693* (2013.01); *F04D 25/166* (2013.01); *F04D 29/005* (2013.01); *F05D 2260/32* (2013.01)

(58) Field of Classification Search

CPC .... F04D 9/646; F04D 19/002; F04D 25/0693; F04D 25/166; F04D 29/005; F04D 29/403; F04D 29/52; F04D 29/522; F05D 2260/32

See application file for complete search history.

(56) References Cited

U.S. PATENT DOCUMENTS

| | | | | |
|---|---|---|---|---|
| 11,686,467 | B1 * | 6/2023 | Yuan | F04D 25/166 362/96 |
| 12,305,655 | B2 * | 5/2025 | Tsai | F04D 29/005 |
| 12,366,355 | B1 * | 7/2025 | Fang | F21V 33/0096 |
| 2023/0366407 | A1 * | 11/2023 | Chang | F04D 29/646 |
| 2024/0324138 | A1 * | 9/2024 | Chi | G06F 1/20 |
| 2025/0102726 | A1 * | 3/2025 | Chen | F04D 25/166 |
| 2025/0251125 | A1 * | 8/2025 | Zheng | F04D 29/005 |

* cited by examiner

*Primary Examiner* — Sang K Kim

(57) ABSTRACT

The present disclosure provides a detachable fan display, including a fan, a display, and a power transmission module. The fan is provided with a joining portion. The display is provided with a docking portion. The docking portion is removably coupled to the joining portion. The power transmission module is electrically connected to the display. Therefore, the fan may have a display effect through cooperation of the display and the power transmission module, and the display and the fan can be easily assembled and disassembled through cooperation between the joining portion of the fan and the docking portion of the display, so as to improve convenience and flexibility of the display during assembly.

8 Claims, 4 Drawing Sheets

DETACHABLE FAN DISPLAY

CROSS-REFERENCE TO RELATED APPLICATION

This non-provisional application claims priority under 35 U.S.C. § 119(a) on Patent Application No(s). 114204976 filed in Taiwan, R.O.C. on May 16, 2025, the entire contents of which are hereby incorporated by reference.

BACKGROUND OF THE INVENTION

1. Field of the Invention

The present disclosure relates to a detachable fan display, and in particular, to a detachable fan display that can be easily assembled and disassembled to improve convenience and flexibility during assembly.

2. Description of the Related Art

Generally, in fans used in computer cases or other electronic devices and electronic components, displays are usually arranged in a fixed manner, so that the fans have both practical and aesthetic effects.

BRIEF SUMMARY OF THE INVENTION

However, generally, a fixed display cannot be assembled or disassembled independently based on usage requirements, which affects convenience and flexibility of the display in use.

Therefore, how to create a detachable fan display to achieve a display effect on the fan and allow the display and the fan to be easily assembled and disassembled, to improve the convenience and flexibility of the display during assembly, thereby effectively improving shortcomings of conventional use, will be a point that the present disclosure wants to actively reveal.

In view of the above shortcomings in the prior art, the creator felt that the creation was not perfect, so he/she used all his/her brains to carefully research and overcome the shortcomings, and then developed a detachable fan display, hoping to enable the fan to have a display effect and allow the display and the fan to be easily assembled and disassembled through cooperation of the display and a power transmission module, so as to improve the convenience and flexibility of the display during assembly.

To achieve the above objective and other objectives, the present disclosure provides a detachable fan display, including: a fan, at least one display, and at least one power transmission module. At least one side of the fan is provided with a joining portion. A bottom surface of the at least one display is provided with a docking portion. The docking portion is removably coupled to the joining portion. The power transmission module is electrically connected to the at least one display.

In an embodiment of the above detachable fan display, the fan includes a frame, a driving module, a fan blade, and a plurality of first connectors. The driving module is arranged on the frame. The fan blade is pivotally connected to the driving module. Each of the first connectors is electrically connected to the driving module and arranged on the frame, and the joining portion is arranged on at least one side of the frame.

In an embodiment of the above detachable fan display, each of the first connectors is a magnetic connector.

In an embodiment of the above detachable fan display, the at least one display includes a base, an image output module, and a plurality of second connectors. The image output module is arranged on the base. Each of the second connectors is electrically connected to the image output module and arranged on the base. The docking portion is arranged on a bottom surface of the base, and the power transmission module is electrically connected to one of the second connectors.

In an embodiment of the above detachable fan display, the image output module is a display screen or a light-emitting diode, and each of the second connectors is a magnetic connector.

In an embodiment of the above detachable fan display, the joining portion is provided with at least two hook holes, and the docking portion is provided with at least two hooks, so that the docking portion is removably coupled to the joining portion.

In an embodiment of the above detachable fan display, the joining portion is provided with at least two hooks, and the docking portion is provided with at least two hook holes, so that the docking portion is removably coupled to the joining portion.

In an embodiment of the above detachable fan display, the power transmission module is a magnetic connector.

Therefore, the fan may have a display effect through cooperation of the display and the power transmission module, and the display and the fan can be easily assembled and disassembled through cooperation between the joining portion of the fan and the docking portion of the display, so as to improve convenience and flexibility of the display during assembly.

DETAILED DESCRIPTION OF THE INVENTION

Figure 1:
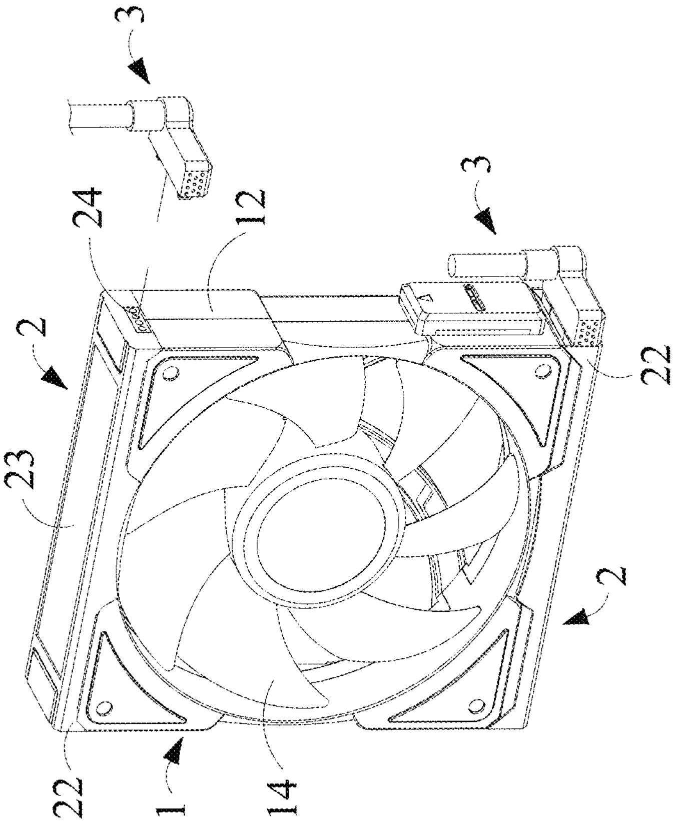
FIG. 1 is a schematic diagram of an appearance according to a preferred embodiment of the present disclosure.
Figure 2:
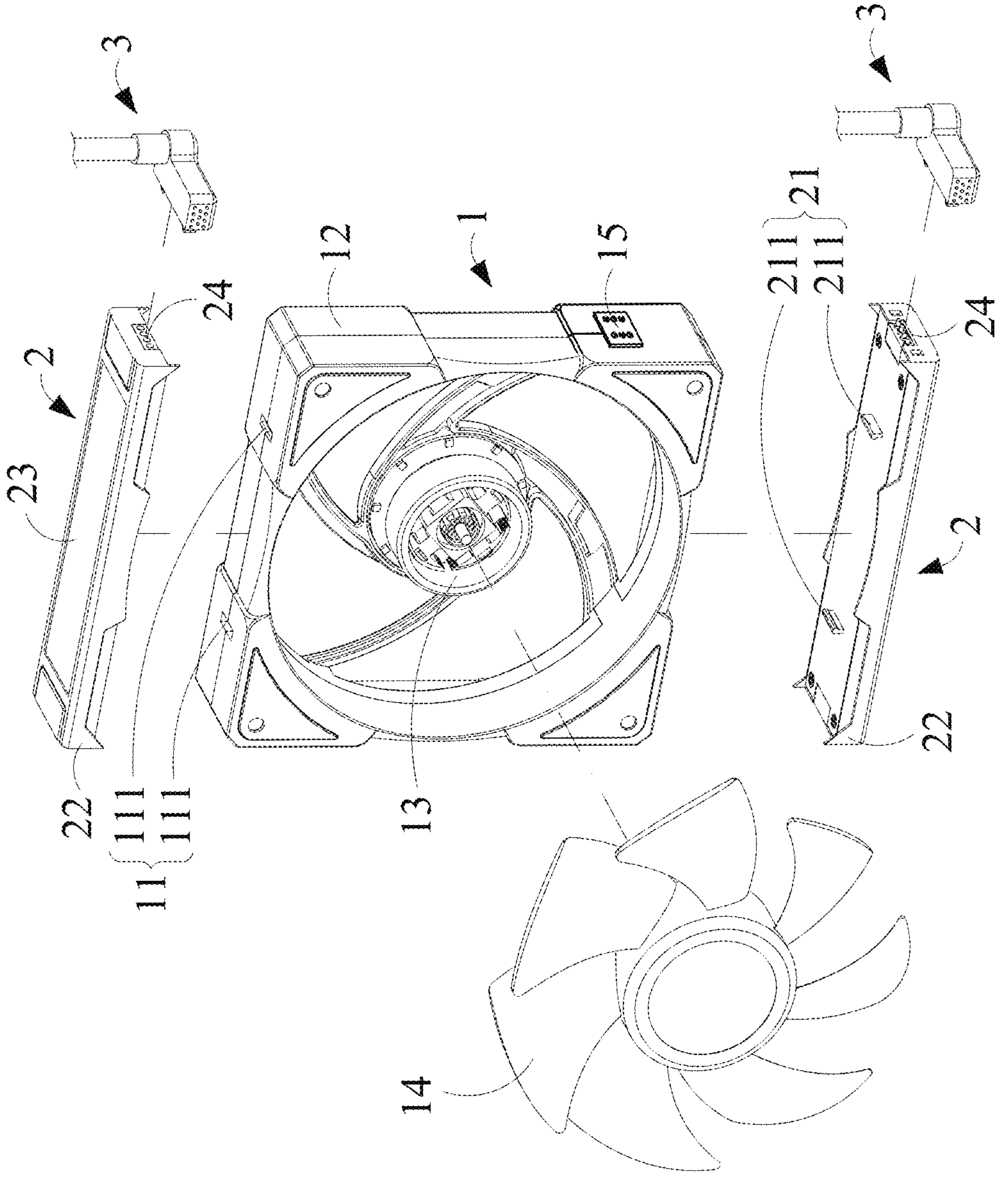
FIG. 2 is a schematic exploded view according to a preferred embodiment of the present disclosure.

To fully understand the objectives, features, and effects of the present disclosure, the present disclosure is described in detail through the following specific embodiments and the accompanying drawings. The description is as follows.

Refer to FIG. 1 to FIG. 4. As shown in the figures, the present disclosure relates to a detachable fan display, including a fan 1, at least one display 2, and at least one power transmission module 3.

At least one side of the fan 1 is provided with a joining portion 11. In an embodiment of the present disclosure, the fan 1 includes a frame 12, a driving module 13, a fan blade 14, and a plurality of first connectors 15. The driving module 13 is arranged on the frame 12. The fan blade 14 is pivotally connected to the driving module 13. Each of the first connectors 15 is electrically connected to the driving module 13 and arranged on the frame 12, and the joining portion 11 is arranged on at least one side of the frame 12 (for example, the joining portion may be arranged on two sides or four sides of the frame 12). Each of the first connectors 15 may be a magnetic connector, and may use one of the first connectors 15 to capture external power (not shown in the drawings) to the driving module 13, so that the driving module 13 drives the fan blade 14 into rotation, and the fan blade 14 is used to guide airflow to achieve an effect of heat dissipation.

A bottom surface of the display 2 is provided with a docking portion 21. The docking portion 21 is removably coupled to the joining portion 11. In an embodiment of the present disclosure, the display 2 includes a base 22, an image output module 23, and a plurality of second connectors 24. The image output module 23 is arranged on the base 22. Each of the second connectors 24 is electrically connected to the image output module 23 and arranged on the base 22. The docking portion 21 is arranged on a bottom surface of the base 22. The image output module 23 may be a display screen or a light-emitting diode. Each of the second connectors 24 may be a magnetic connector.

The power transmission module 3 is electrically connected to the display 2. The power transmission module 3 may be a magnetic connector. The power transmission module 3 is electrically connected to one of the second connectors 24.

Based on the above embodiments, when the display 2 is mounted to the fan 1, the display 2 may correspond to the frame 12 of the fan 1 through the base 22, and the base 22 and the frame 12 may be engaged with each other, so that the docking portion 21 of the display 2 is correspondingly mounted to the joining portion 11 of the fan 1. In this way, the fan 1 may have a display effect through cooperation of the display 2 and the power transmission module 3, and the display 2 and the fan 1 can be easily assembled and disassembled through cooperation between the joining portion 11 of the fan 1 and the docking portion 21 of the display 2, so as to improve convenience and flexibility of the display 2 during assembly.

In addition to the above embodiments, in an embodiment of the present disclosure, a difference between the embodiment and the above embodiment is that the joining portion 11 is provided with at least two hook holes 111 (or two hooks). The docking portion 21 is provided with at least two hooks 211 (or two hook holes), so that the docking portion 21 of the display 2 is removably coupled to the joining portion 11 of the fan 1 through docking of each of the hooks 211 and each of the hook holes 111. In this way, the display 2 and the fan 1 can be easily assembled and disassembled through cooperation between the joining portion 11 of the fan 1 and the docking portion 21 of the display 2, so as to improve convenience and flexibility of the display 2 during assembly.

Figure 3:
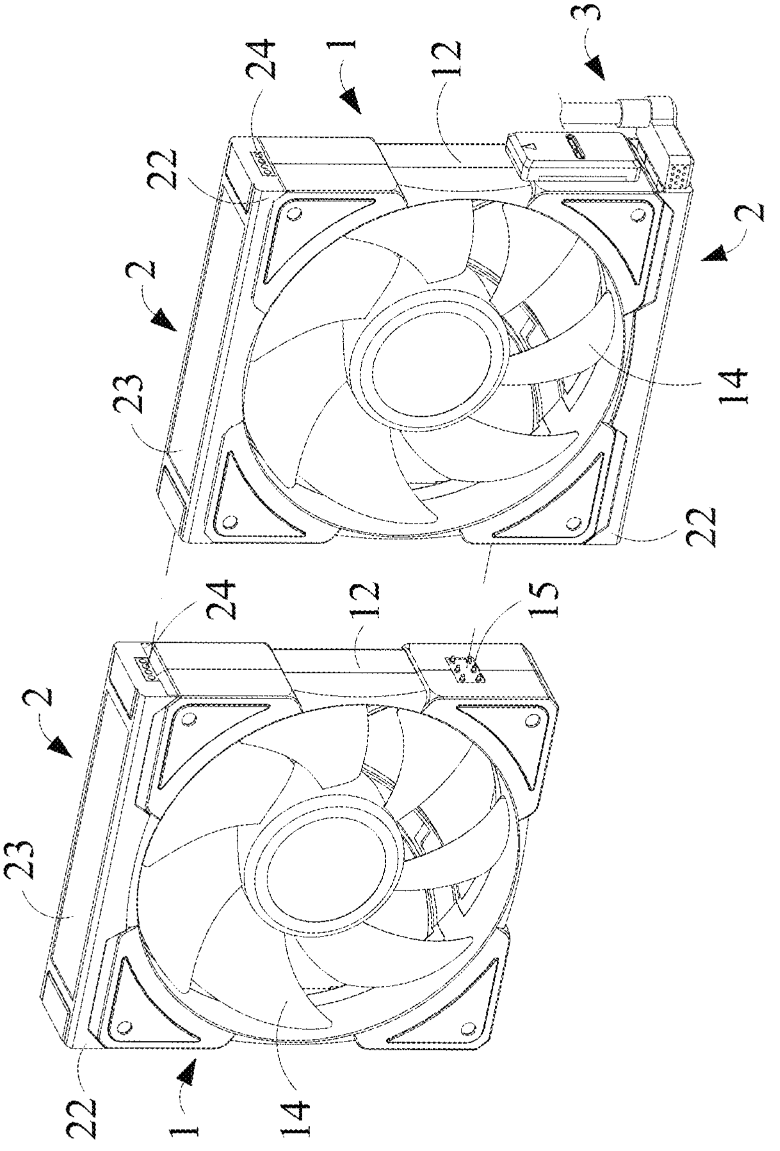
FIG. 3 is a schematic diagram I of another usage state according to the present disclosure.
Figure 4:
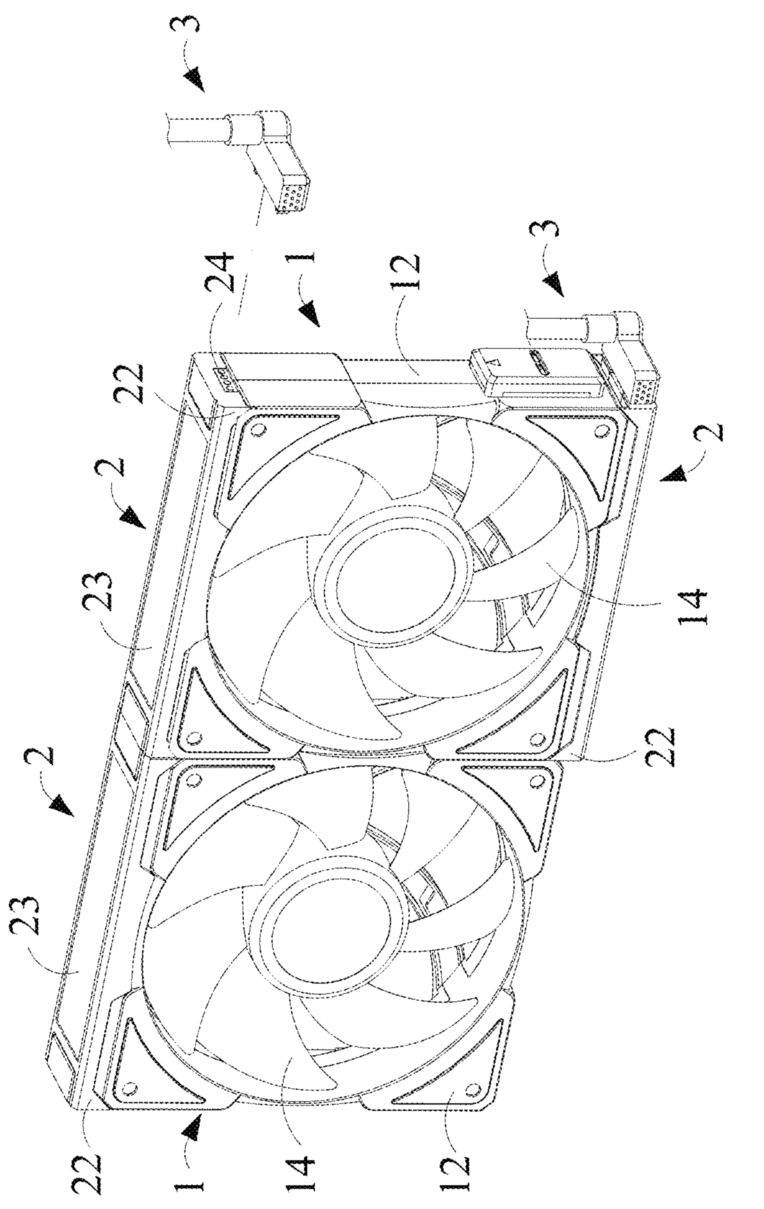
FIG. 4 is a schematic diagram II of another usage state according to the present disclosure.

In addition, based on the above embodiments, when a plurality of fans 1 are to be used (as shown in FIG. 3 and FIG. 4), one of the first connectors 15 of one of the fans 1 may be electrically connected to an external power source, and other first connectors 15 of the fans 1 may be electrically connected to each other in a magnetic manner, so that the first connector 15 of each of the fans 1 may be easily connected in series, thereby improving convenience of connecting the plurality of fans in series. After the plurality of fans 1 are connected in series, a required quantity of displays 2 may be arranged simultaneously or separately on each of the fans 1 as needed, so that the docking portion 21 of each of the displays 2 is coupled to the joining portion 11 of each of the fans 1, the second connector 24 of one of the displays 2 is electrically connected to the power transmission module 3, and the other second connectors 24 of the displays 2 may be electrically connected to each other in a magnetic manner, so that the second connector 24 of each of the displays 2 may be easily connected in series, thereby improving the convenience of connecting the plurality of fans in series. In this way, the display 2 and the fan 1 can be easily assembled and disassembled through cooperation between the joining portion 11 of the fan 1 and the docking portion 21 of the display 2, so as to improve convenience and flexibility of the display 2 during assembly.

Although the present disclosure has been disclosed with preferred embodiments above, a person skilled in the art should understand that the embodiments are only used to describe the present disclosure, and should not be interpreted as limiting the scope of the present disclosure. It should be noted that all changes and substitutions equivalent to the embodiment should be considered to fall within the scope of the present disclosure. Therefore, the protection scope of the present disclosure is subject to the scope defined by the patent claims.

What is claimed is:

1. A detachable fan display, comprising:

a fan including a frame, wherein at least one side surface of the frame is provided with a joining portion exposed to the outside of the frame;

at least one display, wherein the at least one display comprises a base and an image output module, the image output module is arranged on the base, a bottom surface of the base is provided with a docking portion, and the docking portion is removably coupled to the joining portion, and wherein a plurality of side surfaces of the base are respectively provided with a second connector electrically connected to the image output module and exposed to the outside of the base; and at least one power transmission module, magnetically coupled to one of the second connectors from the outside of the base to provide power.

2. The detachable fan display according to claim 1, wherein the fan comprises a frame, a driving module, a fan blade, and a plurality of first connectors, the driving module is arranged on the frame, the fan blade is pivotally connected to the driving module, each of the first connectors is electrically connected to the driving module and arranged on the frame, and the joining portion is arranged on at least one side of the frame.

3. The detachable fan display according to claim 2, wherein each of the first connectors is a magnetic connector.

4. The detachable fan display according to claim 1, wherein the at least one display comprises a plurality of second connectors, each of the second connectors is electrically connected to the image output module and arranged on the base, and the at least one power transmission module is electrically connected to one of the second connectors.

5. The detachable fan display according to claim 4, wherein the image output module is a display screen or a light-emitting diode, and each of the second connectors is a magnetic connector.

6. The detachable fan display according to claim 1, wherein the joining portion is provided with at least two hook holes, and the docking portion is provided with at least two hooks, so that the docking portion is removably coupled to the joining portion.

7. The detachable fan display according to claim 1, wherein the joining portion is provided with at least two hooks, and the docking portion is provided with at least two hook holes, so that the docking portion is removably coupled to the joining portion.

8. The detachable fan display according to claim 1, wherein the power transmission module is a magnetic connector.

* * * * *